United States Patent
Miyazaki et al.

[11] Patent Number: 5,863,624
[45] Date of Patent: Jan. 26, 1999

[54] CAN-COVERING POLYESTER FILM AND PRODUCTION PROCESS THEREOF

[75] Inventors: Shunzo Miyazaki; Michiya Tamura; Hideyuki Yoshizawa; Yasuo Honma; Koji Matsushima; Tsutomu Shinomiya; Hideyuki Tamura, all of Iwatsuki, Japan

[73] Assignee: Hokkai Can Co., Ltd., Tokyo, Japan

[21] Appl. No.: 604,371

[22] Filed: Feb. 21, 1996

Related U.S. Application Data

[63] Continuation of Ser. No. 213,067, Mar. 15, 1994, abandoned.

[30] Foreign Application Priority Data

Mar. 15, 1993 [JP] Japan ................................. 5-053843
Sep. 16, 1993 [JP] Japan ................................. 5-229998

[51] Int. Cl.$^6$ ............................. B32B 1/02; B32B 7/12; B32B 15/08; B32B 27/08
[52] U.S. Cl. ................... 428/35.9; 428/35.8; 428/200; 428/209; 428/219; 428/344; 428/347; 428/349; 428/355 EP; 428/414; 428/416; 428/423.7; 428/458; 428/480; 220/610; 220/906
[58] Field of Search .................... 428/622, 623, 428/624, 626, 413, 414, 416, 423.1, 423.7, 35.8, 35.9, 480, 666, 667, 660, 648, 200, 209, 219, 344, 347, 349, 458; 528/87; 525/438, 441, 442

[56] References Cited

U.S. PATENT DOCUMENTS

| | | | |
|---|---|---|---|
| 4,511,631 | 4/1985 | Fujimoto et al. | 428/632 |
| 4,604,308 | 8/1986 | Widmer et al. | 428/35 |
| 4,608,130 | 8/1986 | Shimizu et al. | 204/27 |
| 4,614,691 | 9/1986 | Inui et al. | 428/623 |
| 4,773,558 | 9/1988 | Taira et al. | 220/270 |
| 5,000,809 | 3/1991 | Adesko et al. | 156/230 |
| 5,011,560 | 4/1991 | Nakai et al. | 156/27.33 |
| 5,048,317 | 9/1991 | Hirota et al. | 72/347 |
| 5,137,762 | 8/1992 | Aizawa et al. | 428/35.8 |
| 5,168,015 | 12/1992 | Shimizu et al. | 428/629 |
| 5,213,903 | 5/1993 | Kawamura et al. | 428/623 |
| 5,242,404 | 9/1993 | Ishihara et al. | 428/458 |

FOREIGN PATENT DOCUMENTS

| | | |
|---|---|---|
| 0119164 | 9/1984 | European Pat. Off. . |
| 0493119 | 1/1992 | European Pat. Off. . |
| 1745449 | 9/1971 | Germany . |
| 51-42786 | 4/1976 | Japan . |
| 64-70352 | 3/1989 | Japan . |
| 2-242738 | 9/1990 | Japan . |
| 2164899 | 3/1986 | United Kingdom . |

OTHER PUBLICATIONS

Database WPI, Week 8648, Derwent Publications Ltd., London, GB; An 86–314835 & JP–A–61 232 148 (Hokkai Seikan KK) 16 Oct. 1986, abstract.

*Primary Examiner*—Vivian Chen
*Attorney, Agent, or Firm*—Birch, Stewart, Kolasch & Birch, LLP

[57] ABSTRACT

A can-covering polyester film which is bonded under heat to a metal surface of a can through a thermosetting resin adhesive to form a protective coat, wherein the adhesive layer is formed of a resin comprising an epoxy resin having a number average molecular weight of 5,000–20,000 and a trimellitic acid anhydride hardener at a weight ratio of 70/30 to 99/1.

14 Claims, 8 Drawing Sheets

CAN-COVERING POLYESTER FILM AND PRODUCTION PROCESS THEREOF

This application is a continuation of application Ser. No. 08/213,067 filed on Mar. 15, 1994, now abandoned.

BACKGROUND OF THE INVENTION

1. Field of the Invention

The present invention relates to a polyester film with a thermosetting resin adhesive layer, which is adapted to form a protective coat on a metal surface of a can, for example, a surface of a metal sheet for forming a can body, such as a surface-treated steel sheet both end edges of which are overlapped to each other to weld them, thereby forming the can body, or an outer side wall of a closed-end cylindrical can having an opening at one end thereof and formed by drawing with ironing or the like from a metal sheet for forming cans such as an aluminum alloy sheet, and a production process thereof.

2. Description of the Background Art

As metal cans used as containers for beverage, there have been known welded cans obtained by welding both end edges of a strip-like can body blank obtained by cutting a surface-treated steel sheet for cans, which has a tin deposit, to each other to form a can body and attaching can ends separately produced to both open ends of the can body by double-seaming. In order to prevent the corrosion of the surface-treated steel sheet for cans as a base metal due to the contact of the base metal with the contents in a can and the change in the flavor of the contents, which is caused by the dissolving of metal components of the can, the welded cans as described above have heretofore been coated with a coating such as an epoxy-phenolic resin on the inside thereof. In addition, coating has been conducted on the outside of the can to impart a good aesthetic appearance.

Such welded cans have been produced by conducting baking in a heating oven whenever coating was completed on each side of the surface-treated steel sheet for cans. Therefore, in this production process, heat in the heating oven and vaporized organic solvents have a tendency to impair a working environment. In particular, the tendency becomes more pronounced on the outer surface of the can, which is subjected to multicolor printing, because baking is carried out in the heating oven whenever printing is conducted with each of two to four coatings of different colors.

It has thus been studied to cover both sides of the surface-treated steel sheet for cans with a polyester film to form protective coats. Such covering can prevent the surface-treated steel sheet from corrosion on the inside of the can, and moreover protect the flavor of the contents in the can from being changed due to components slightly dissolved out of the coating film on the can on the inside of which an internal protective coating has been applied and baked as described above. On the other hand, a good aesthetic appearance and/or desired indication can be given to the outer surface of the can without conducting coating by covering it with a printed polyester film. Therefore, such covering makes it unnecessary to conduct the coating and baking in the conventional production process and hence can be expected to the improve working environment.

In order to cover both sides of the surface-treated steel sheet for cans with polyester films, it is considered to press-bond the polyester films to the surfaces of the heated steel sheet.

However, the mere press bonding of the polyester films to the surfaces of the surface-treated steel sheet for cans heretofore in use under heat for a short period of time cannot achieve sufficient adhesion. Besides, the bonding of the polyester films to the surfaces of the surface-treated steel sheet through a usual thermosetting resin adhesive requires a long time for heating at a high temperature to obtain sufficient adhesion. However, if the surface-treated steel sheet has a tin deposit, such a heating treatment is accompanied by a disadvantage that tin in the tin deposit forms a tin-iron alloy together with a base steel sheet during the heating, so that the amount of pure tin is decreased, and the weldability of the surface-treated steel sheet is hence reduced.

There have also been known cans obtained by forming a closed-end cylindrical can having an opening at one end thereof by drawing with ironing or the like from a metal sheet for forming cans such as an aluminum alloy sheet and attaching a can end separately produced to the opening of the can by double-seaming. As with the case of the welded cans, such cans are also accompanied by a disadvantage that heat in the heating oven and vaporized organic solvents impair a working environment if coating by printing is conducted on the outside of the can to impart a good aesthetic appearance.

In the case of the closed-end cylindrical can, coating is first conducted on the inner side of the closed-end cylindrical can formed by drawing with ironing or the like from the metal sheet for forming cans, and baking is then effected. Thereafter, 2 to 4 coatings of different colors are then coated on the outer side of the can one by one, and baking is conducted with every coating. Therefore, it is considered to press-bond the polyester film under heat to at least the outer surface of the closed-end cylindrical can.

As with the case of the surface-treated steel sheet for forming can bodies of welded cans, however, the mere press bonding of the polyester films to the surfaces of the metal sheet for forming cans heretofore in use under heat for a short period of time cannot achieve sufficient adhesion. Besides, the bonding of the polyester film to the surface of the metal sheet through a usual thermosetting resin adhesive involves a disadvantage that it requires a long time for heating at a high temperature to obtain sufficient adhesion, resulting in unavoidable reduction in operating efficiency and increase in cost.

SUMMARY OF THE INVENTION

Accordingly, the present invention has been made with a view toward solving the above-mentioned problems and has as its object the provision of a can-covering polyester film, which can achieve sufficiently high adhesion to a metal surface of a can by heating for a short period of time at a high temperature, and a production process thereof.

It is another object of the present invention to provide a can-covering polyester film, which can achieve sufficient high adhesion to a surface of a metal sheet for forming a can body, both end edges of which are overlapped to each other to weld them, thereby forming the can body, and a production process thereof.

It is a further object of the present invention to provide a can-covering polyester film, which can achieve sufficiently high adhesion to at least an outer side wall of a closed-end cylindrical can having an opening at one end thereof and formed by drawing with ironing or the like from a metal sheet for forming cans, and a production process thereof.

It is still a further object of the present invention to provide a can-covering polyester film, which can make a print applied to the film look bright when the film is bonded to the metal surface of the can, and a production process thereof.

In order to achieve the above objects, in an aspect of the present invention, there is thus provided a can-covering polyester film which is bonded under heat to a metal surface of a can through a thermosetting resin adhesive to form a protective coat, wherein an adhesive layer formed of a resin comprising an epoxy resin having a number average molecular weight of 5,000–20,000 and an acid anhydride hardener at a weight ratio of 70/30 to 99/1 is provided on one side of a polyester film.

In another aspect of the present invention, there is provided a can-covering polyester film which is bonded under heat to a metal surface of a can through a thermosetting resin adhesive to form a protective coat, wherein an adhesive layer formed of a resin comprising a polyester resin and an aminoplast resin at a weight ratio of 70/30 to 90/10 is provided on one side of a polyester film.

It is a further aspect of the present invention, there is provided a process for the production of a can-covering polyester film which is bonded under heat to a metal surface of a can through a thermosetting resin adhesive to form a protective coat, which comprises the steps of:

applying a thermosetting resin to one side of a polyester film and drying the resin thus coated to form a cured overcoat layer;

applying a resin composition containing a pigment to the other side of the polyester film and drying the composition thus coated to form a printed layer; and applying the thermosetting resin adhesive to the side of the polyester film, on which the printed layer has been formed, and drying the resin adhesive thus coated to form an adhesive layer.

Other objects and advantages of the present invention will be readily appreciated from the preferred embodiments of the present invention, which will be described subsequently in detail with reference to the accompanying drawings.

DETAILED DESCRIPTION OF THE PREFERRED EMBODIMENTS

Figure 1A:
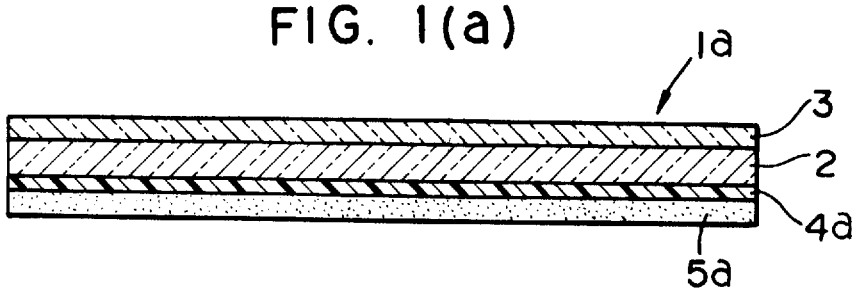
FIGS. 1(a) to 1(d) are cross-sectional views illustrating the constructions of can-covering polyester films according to the present invention.

In the adhesive layer comprising the epoxy resin and the acid anhydride, if the number average molecular weight of the epoxy resin is lower than 5,000, its bond strength is insufficient. If the molecular weight exceeds 20,000, the viscosity is increased, resulting in an adhesive poor in working properties in coating. It is hence not preferable to use any epoxy resin having a number average molecular weight outside the range of 5,000–20,000. In addition, if the number average molecular weight is lower than 5,000, the stickiness of the adhesive layer becomes higher when the adhesive is applied to the polyester film and dried to form the adhesive layer, so that its tack-free properties are lowered.

In the adhesive layer, if the weight ratio of the epoxy resin to the acid anhydride hardener exceeds 99/1, it takes a long period of time to cure the epoxy resin even when heated at a high temperature. If the weight ratio is lower than 70/30 on the other hand, the effect of facilitating the curing of the epoxy resin cannot be heightened further.

As examples of the acid anhydride hardener, may be mentioned pyromellitic anhydride, benzophenone tetracarboxylic anhydride, phthalic anhydride, tetrahydrophthalic anhydride, methylcyclohexane dicarboxylic anhydride, trimellitic acid anhydride and derivatives thereof. However, trimellitic acid anhydride hardeners including trimellitic acid anhydride and derivatives thereof are suitable in that they are excellent in hardenability, blocking resistance of a film formed after coating and tack-free properties. As examples of the derivatives of trimellitic acid anhydride, may be mentioned glycerol tristrimellitate anhydride, a dimer of trimellitic acid anhydride, ethylene glycol bistrimellitate anhydride, etc.

As the epoxy resin forming the adhesive layer, may be used a bisphenol type epoxy resin obtained by reaction of bisphenol A and epichlorohydrin. Further, the adhesive layer may contain other hardeners such as a phenolic resin in addition to the acid anhydride hardener.

In the adhesive layer comprising the polyester resin and the aminoplast resin, if the weight ratio of the polyester resin to the aminoplast resin exceeds 90/10, it takes a long period of time to cure the adhesive layer even when heated at a high temperature. If the weight ratio is lower than 70/30 on the other hand, the curing of the adhesive advances to excess, so that the processability of the adhesive is deteriorated. It is hence not preferable to mix both resins at any weight ratio outside the above range. As the polyester resin, a known polyester resin may be used singly, or an epoxy-modified polyester resin modified by an epoxy resin or the like may be used. As the aminoplast resin, may be used a melamine resin, benzoguanamine resin or the like. The adhesive layer may contain an epoxy resin in combination with the polyester resin and the aminoplast resin.

As the polyester film, may be used any polyester film so far as it is excellent in strength, transparency and suitability to the contents of the cans such as retention of good flavor, and formed from a polyester obtained by polycondensation of a dicarboxylic acid and a diol component. In order to secure dimensional stability to a heat treatment which is conducted for bonding the film under heat to the metal surface through the adhesive layer, however, polyesters obtained by polycondensation of an aromatic dicarboxylic acid such as naphthalene dicarboxylic acid, terephthalic acid or isophthalic acid and a diol such as ethylene glycol, propylene glycol or butylene glycol are preferred, with a polyester(polyethylene naphthalate) obtained by polycondensation of naphthalene dicarboxylic acid and ethylene glycol or a polyester(polyethylene terephthalate) obtained by polycondensation of terephthalic acid and ethylene glycol being especially preferred.

With respect to the above-mentioned polyesters, the above-described dicarboxylic acid component or diol component may contain one or more other dicarboxylic acid components or diol components if desired. As preferable examples of the poly esters other than poly ethylene terephthalate, may be mentioned polyesters described in Japanese Patent Application Laid-Open Nos. 42786/1976, 70352/1989, 242738/1990, etc.

The polyester film may preferably be subjected in advance to a surface-oxidation treatment by corona discharge or the like on a side to be coated with the adhesive to enhance its adhesion.

The polyester film preferably has a thickness ranging from 5 to 50 $\mu$m. If the thickness of the polyester film is thinner than 5 $\mu$m, the film tends to be damaged upon processing, and hence its effects of preventing corrosion of the can and dissolution of the metal may not be exhibited sufficiently due to formation of pinholes or the like in some cases. On the other hand, if the thickness exceeds 50 $\mu$m, the residual stress of the film becomes greater, so that there is a tendency to reduce the adhesion of the polyester film to the metal surface of the can upon subjecting the can body to drawing such as neck-in forming. It is hence not preferable to use any polyester films having a thickness outside the above range.

According to the can-covering polyester film of the present invention, which has the above-described features, either the adhesive layer formed of the resin comprising the epoxy resin having a number average molecular weight of 5,000–20,000 and the acid anhydride hardener at a weight ratio of 70/30 to 99/1 or the resin adhesive layer comprising the polyester resin and the aminoplast resin at a weight ratio of 70/30 to 90/10 is provided on one side of the polyester film. Therefore, when the can-covering polyester film is bonded under heat to a metal surface of a can, the curing of the adhesive layer is facilitated by the hardener upon heating at a high temperature, so that strong adhesion can be achieved in a short period of time.

In order to secure dimensional stability to the heat treatment, it is particularly preferred from the viewpoint of physical properties of material that the polyester film be a biaxially oriented polyester film having a heat shrinkage factor in a longitudinal direction of 1.2% or lower and a heat shrinkage factor in a lateral direction of 0% as determined after holding the film at 150° C. for 30 minutes. In order to secure the dimensional stability, it may also be subjected to a heat treatment in which the film is held in advance at 160° C. for about 6 seconds. However, it is particularly preferred that a cured overcoat layer formed of a thermosetting resin be provided on the opposite side of the adhesive layer. When the cured overcoat layer is provided on the polyester film, the residual stress in the polyester film is lightened, the expansion or contraction of the film is controlled, thereby securing the dimensional stability, and the resistance to damage is improved. Although cans for beverage are generally subjected to a heat sterilization treatment (retort sterilization treatment) after filling the can with their contents, the provision of the cured overcoat layer can prevent low-polymerization degree components (oligomers) in the polyester film from depositing on the surface of the film upon the heating treatment such as the retort sterilization treatment, and makes the slidability of the polyester film good.

In order to be capable of forming a cured film in a short period of time at a high temperature, the thermosetting resin forming the cured overcoat layer is suitably a resin, for example, comprising an epoxy resin and an aminoplast resin and containing, as a short-time curing catalyst, an organic acid or an inorganic acid such as phosphoric acid or polyphosphoric acid therein. The thermosetting resin may preferably contain a silicon compound such as silica or wax for improving the slidability.

The polyester film may be printed for giving the can a good aesthetic appearance and/or desired indication when the film covers the metal surface on the outside of the can. In this case, the film is required to have sufficient strength to be subjected to printing and dimensional stability to the heat treatment upon bonding it to the metal surface of the can. Therefore, a heat-resistant polyester film such as polyethylene naphthalate, or uniaxially or biaxially oriented polyethylene terephthalate, or the like is preferred.

When printing is conducted on the polyester film, a printed layer formed of a pigment-containing resin composition is provided between the polyester film and the adhesive layer. The printed layer may be provided between the polyester film and the overcoat layer. However, it is preferable to provide the printed layer between the polyester film and the adhesive layer because the printed layer is protected by the polyester film against damage. When multicolor printing is conducted on the polyester film for giving the can a good aesthetic appearance and/or desired indication, the printed layer is formed by laminating resin compositions separately containing pigments of different colors on one another.

The printed layer may be partly whitened when conducting the retort sterilization treatment after filling the can with its contents, thereby making the print unclear. However, according to the polyester film according to the present invention, such whitening which may be caused by the retort sterilization treatment can be prevented by providing a size coat layer formed of a resin composition prepared by omitting the pigment from the resin composition forming the printed layer between the printed layer and the adhesive layer.

As a printing ink forming the printed layer, may be used any known printing ink. As examples of its resin component, may be mentioned polyurethane resins, polyester polyurethane resins, epoxy resins, epoxybutyral resins, vinyl resins, cellulosic resins, polyisocyanate resins and the like. They may be used either singly or in combination. It is preferable to suitably choose the resin composition according to the kind of the resin forming the adhesive layer in order to achieve sufficient bond strength to the metal surface of the can in a short period of time at a high temperature.

More specifically, when the resin of the adhesive layer is a resin comprising the epoxy resin having the number average molecular weight as describe above and the acid anhydride hardener at the above-described weight ratio, the resin composition forming the printed layer is suitably a resin composition comprising an epoxybutyral resin and a polyisocyanate resin and containing a pigment, or a resin composition comprising a polyester polyurethane resin and a polyisocyanate resin and containing a pigment. Alternatively, when the resin of the adhesive layer is a resin comprising the polyester resin and the aminoplast resin at the above-described weight ratio, the resin composition forming the printed layer is suitably a resin composition comprising a polyester polyurethane resin and a polyisocyanate resin and containing a pigment.

The above combination of the resin composition and the adhesive layer permits the achievement of strong adhesion by heating for a short period of time at a high temperature when the polyester film is bonded under heat to the metal surface of the can through the adhesive layer, and hence has an effect of preventing the polyester film from peeling off in drawing at the opening(s) of a can body upon the formation of a can or in a retort sterilization treatment after filling the can with its contents.

The resin forming the adhesive layer may preferably contain an inorganic or organic pigment for hiding the bare metal surface of the can. As the pigment, titanium oxide is particularly preferred. Titanium oxide is used at a weight ratio of 20/80–80/20 to the resin.

The adhesive layer contains titanium oxide as a pigment, whereby the bare metal surface of the can is hidden at the time the polyester film is bonded under heat to the metal surface of the can, and the surface of the film has an attractive appearance. In particular, when the printed layer is provided, a background of the adhesive layer containing titanium oxide can make a design, characters and/or the like printed thereon look vivid.

The polyester film may be plain when the film covers the metal surface on the inside of the can, and hence needs neither the cured overcoat layer nor the printed layer. In this case, the strength and dimensional stability are not strictly required of the film. Therefore, the polyester film may be either an unoriented polyester film or a uniaxially or biaxially oriented polyester film. However, a polyethylene terephthalate film is suitable from the viewpoint of suitability for the covering process and quality of a can covered with the film.

When the can-covering polyester film according to the present invention is bonded under heat through the adhesive layer to a surface of a metal sheet for forming a can body, such as a surface-treated steel sheet both end edges of which are overlapped to each other to weld them, thereby forming a can body, or at least an outer side wall of a closed-end cylindrical can having an opening at one end thereof and formed by drawing with ironing or the like from a metal sheet for forming cans, strong adhesion can be achieved therebetween by heating for a short period of time at a high temperature.

As examples of the metal sheet for forming the closed-end cylindrical can, may be mentioned an aluminum alloy sheet for cans and the like. As the surface-treated steel sheet from which the can body is formed by welding, may be used any surface-treated steel sheet so far as it is suitable for use in forming can bodies of welded cans. In particular, the can-covering polyester films according to the present invention shows an excellent effect for the following surface-treated steel sheets for forming can bodies of welded cans.

The first surface-treated steel sheet for forming can bodies of welded cans, to which the can-covering polyester film according to the present invention is bonded under heat through the adhesive layer, thereby obtaining a particularly superior effect, is characterized in that it has a tin-iron alloy layer formed on a base steel sheet at a deposition rate of 0–1.2 g/m$^2$ in terms of tin content and a tin layer plated on the tin-iron alloy layer at a tin deposition rate of 0.5–1.6 g/m$^2$. When the can-covering polyester film according to the present invention is bonded by heating at a high temperature to such a tinned steel sheet through the adhesive layer, strong adhesion can be obtained in a short period of time therebetween. When the surface-treated steel sheet is subjected to a high-temperature treatment such as the above bonding under heat, the tin layer plated on the surface of the steel forms a tin-iron alloy with a base steel sheet, so that the amount of pure tin is decreased. However, since the surface-treated steel sheet has the above-described constitution, the formation of the tin-iron alloy is suppressed even when subjected to the high-temperature treatment. At a stage when the film has been bonded under heat, but before welding, a tin-iron alloy layer having a deposition rate of 0.35–1.60 g/m$^2$ in terms of tin content is formed, and a tin layer having a tin deposition rate of 0.10–1.35 g/m$^2$ is surely held on the tin-iron alloy layer formed. Therefore, good weldability can be provided upon the formation of a can body by welding.

If the tin content in the tin-iron alloy layer in the surface-treated steel sheet is increased over 1.2 g/m$^2$, the effect of suppressing the formation of a tin-iron alloy cannot be heightened further. Besides, even if no tin-iron alloy layer is formed, a tin-iron alloy layer containing tin within the above range is formed at an initial stage of the high-temperature treatment, so that the effect of suppressing the formation of a tin-iron alloy is brought about by the tin-iron alloy layer thus formed. If the tin deposition rate of the tin layer is lower than 0.5 g/m$^2$, a tin layer containing tin in an amount required for welding may not be obtained in some cases after the high-temperature treatment. If the tin deposition rate exceeds 1.6 g/m$^2$ on the other hand, the tin deposition rate is in excess, resulting in an economical disadvantage.

The tin-iron alloy layer, which is a constituent for forming the deposit of the tinned steel sheet, is not always evenly covered by the tin layer as its outer layer, but the tin-iron alloy layer and/or the base steel sheet may be locally exposed in some cases. The degree of exposure varies according to the production method of the tinned steel sheet even if the thickness of the tin-iron alloy layer or the tin layer is equal. So-called no reflow type tinned steel sheet has less tendency to expose the tin-iron alloy layer compared with a reflow type tinned steel sheet, namely, has a tendency for the tin layer to relatively evenly cover the tin-iron alloy layer and the base steel sheet. In the present invention, it is therefore preferable to use a tinned steel sheet of the no reflow type as the surface-treated steel sheet.

The second surface-treated steel sheet for forming can bodies of welded cans, to which the can-covering polyester film according to the present invention is bonded under heat through the adhesive layer, thereby obtaining a particularly superior effect, is characterized in that it has an under coat composed of a metallic nickel on the surface of a base steel sheet and a tin layer plated on the under coat at a deposition rate of 0.5–1.7 g/m$^2$ and dispersed in a range of 10–60% of the surface area of a base steel sheet in an islandlike state. When the can-covering polyester film according to the present invention is bonded by heating at a high temperature to such a tinned steel sheet through the adhesive layer, strong adhesion can be obtained in a short period of time therebetween. When the surface-treated steel sheet is subjected to a high-temperature treatment such as the above bonding under heat, a tin layer having a tin deposition rate of at least 0.10 g/m$^2$ and dispersed in a range of 10–60% of the surface area of the base steel sheet in an islandlike state is reformed. The thus-formed tin layer can provide good weldability upon the formation of a can body by welding.

If the tin deposition rate of the tin layer in the surface-treated steel sheet is lower than 0.5 g/m$^2$, the alloying of tin is caused to progress after the high-temperature treatment, so that a tin layer having a tin deposition rate required for welding may not be formed in some cases. If the tin deposition rate exceeds 1.7 g/m² on the other hand, the tin deposition rate is in excess, resulting in an economical disadvantage.

The surface-treated steel sheet can be produced, for example, by a method wherein a tin deposit within the above range is unevenly applied to the base steel sheet, a method wherein a reflowing step after the tinning is carried out under specific conditions, or a combination thereof.

The third surface-treated steel sheet for forming can bodies of welded cans, to which the can-covering polyester film according to the present invention is bonded under heat through the adhesive layer, thereby obtaining a particularly superior effect, is characterized in that it is a thinly tinned steel sheet having a metallic chromium under coat plated on the surface of a base steel sheet at a deposition rate of 10–200 mg/m² and a tin layer plated on the under coat at a deposition rate of 0.1–2.8 g/m². When the can-covering polyester film according to the present invention is bonded by heating at a high temperature to such a thinly tinned steel sheet through the adhesive layer, strong adhesion can be obtained in a short period of time therebetween. Even if the thinly tinned steel sheet is subjected to a high-temperature treatment such as the bonding under heat, the formation of a tin-iron alloy layer on the base steel sheet is prevented by the metallic chromium under coat, so that the tin content in the tin layer remains in the above range, and good weldability can hence be provided upon the formation of a can body by welding.

If the chromium deposition rate in the metallic chromium under coat is lower than 10 mg/m², the formation of the tin-iron alloy layer cannot be prevented sufficiently. If the chromium deposition rate exceeds 200 mg/m² on the other hand, the preventing effect cannot be heightened further. If the tin deposition rate of the tin layer is lower than 0.1 g/m², good weldability may not be provided in some cases upon the formation of a can body by welding. If the tin deposition rate exceeds 2.8 g/m² on the other hand, the tin deposition rate is in excess, resulting in an economical disadvantage.

The fourth surface-treated steel sheet for forming can bodies of welded cans, to which the can-covering polyester film according to the present invention is bonded under heat through the adhesive layer, thereby obtaining a particularly superior effect, is characterized in that it is a tin-free steel having a metallic chromium under coat formed by plating chromium in the form of discs or granules at a deposition rate of 10–200 mg/m². When the can-covering polyester film according to the present invention is bonded by heating at a high temperature to such a tin-free steel through the adhesive layer, strong adhesion can be obtained in a short period of time therebetween. Since the tin-free steel is not tinned, but the metallic chromium under coat plated in the discoid or granular form is embedded in a base steel sheet when the steel is brought into contact under pressure with a welding electrode, welding can be effected by energizing the steel sheet through the metallic chromium under coat.

If the chromium deposition rate of the under coat in the tin-free steel is lower than 10 mg/m², the chromium deposit in the discoid or granular form may not be provided as an under coat having strength sufficient to be embedded in the base steel sheet when the steel is brought into contact under pressure with the welding electrode in some cases. If the chromium deposition rate exceeds 200 mg/m² on the other hand, the chromium deposit may be evenly formed on a wide area of the base steel sheet surface in some cases so as not to provide an under coat in the discoid or granular form.

In general, surface-treated steel sheets for forming can bodies have a thin metallic chromium.chromium oxide layer formed on the surfaces thereof. However, the metallic chromium.chromium oxide layer is far thinner than the above-described tin deposit or the chromium deposit in the discoid or granular form, and hence does not particularly affect the effect of the tin deposit or the chromium deposit in the discoid or granular form. In all the above-described surface-treated steel sheets, accordingly, the metallic chromium.chromium oxide layer may be formed thereon. The metallic chromium.chromium oxide layer formed so as to have a deposition rate of 3–30 mg/m² in terms of chromium content, for example, by a chemical conversion treatment is preferred because it has an effect of enhancing the adhesion properties to the adhesive layer and the corrosion resistance without adversely affecting the weldability of the above-described surface-treated steel sheets.

The can-covering polyester films according to the present invention, on which the adhesive layer, printed layer and cured overcoat layer are provided, can be advantageously produced by a process comprising an overcoat layer-forming step in which a thermosetting resin is applied to one side of a polyester film and dried to form a cured overcoat layer, a printing step in which a resin composition containing a pigment is applied to the other side of the polyester film and dried to form a printed layer and an adhesive layer-forming step in which a thermosetting resin adhesive is applied to the side of the polyester film, on which the printed layer has been formed, and dried to form an adhesive layer.

Since the production process of the can-covering polyester film according to the present invention includes the overcoat layer-forming step, the residual stress in the polyester film is lightened, and moreover its contraction and expansion properties are controlled, whereby a polyester film improved in dimensional stability to the heat treatment in the subsequent step can be provided. In the production process, either the overcoat layer-forming step or the printing step may be given priority. However, when the overcoat layer-forming step is conducted earlier than the printing step, the dimensional stability of the polyester film can be more improved.

When a size coat layer is formed between the printed layer and the adhesive layer, the production process further includes, subsequently to the step of forming the printed layer, a step of applying a resin composition prepared by omitting the pigment from the resin composition forming the printed layer to the printed layer and drying the resin composition thus coated to form the size coat layer. According to this production process, the provision of the size coat layer-forming step can prevent the printed layer from whitening due to the retort sterilization treatment after the formation of a can.

In the production process, all the overcoat layer, printed layer, size coat layer and adhesive layer are formed by gravure coating. By such coating, each of the overcoat layer, printed layer, size coat layer and adhesive layer can be formed to an even thickness.

The present invention will hereinafter be described in more detail by the following exemplary embodiments with reference to the accompanying drawings. However, it should be borne in mind that this invention is not limited to and by the following examples.

In the following Examples 1 to 11, examples where the polyester films according to the present invention are applied to welded cans obtained by overlapping both end edges of each of the metal sheets for forming can bodies to each other to weld them, thereby forming a can body, and attaching can ends separately produced to both open ends of the can body by double seaming will be described.

EXAMPLE 1

In this example, as a polyester film to be bonded to a metal surface which is to be the outside of a can, there is used a can-covering polyester film 1a illustrated in FIG. 1(a). As shown in FIG. 1(a), the polyester film 1a comprises a biaxially oriented polyethylene terephthalate (hereinafter abbreviated as "PET") film 2 having a thickness of 12 µm, which is provided on one side thereof with a transparent cured overcoat layer 3 formed from a thermosetting resin composed of an epoxy resin and an aminoplast resin, to which a short-time curing catalyst of an organic acid or an inorganic acid such as phosphoric acid or polyphosphoric acid has been added, and on the other side thereof with a printed layer 4a printed with printing inks comprising an epoxybutyral resin and a polyisocyanate resin and containing a pigment. In order to give a good aesthetic appearance and/or desired indication to the outer surface of the can, the printed layer 4a is formed by multicolor printing, i.e., by laminating the printing inks comprising the above resin components and separately containing pigments of desired colors on each other.

On the printed layer 4a, there is provided an adhesive layer 5a formed of a thermosetting resin adhesive comprising a bisphenol type epoxy resin obtained by the reaction of bisphenol and epichlorohydrin and having a number average molecular weight of 10,000, and glycerol tristrimellitate anhydride as a trimellitic acid anhydride hardener at a weight ratio of 95/5. At least one pigment such as titanium oxide may be used to disperse it in the adhesive layer 5a if desired.

Figure 2:
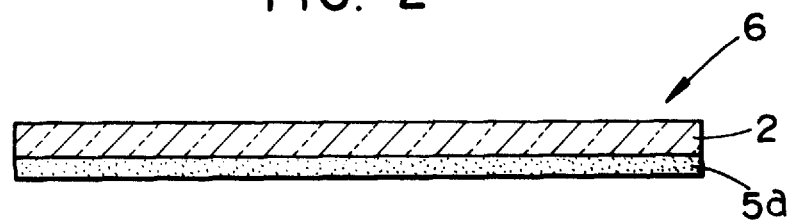
FIG. 2 is a cross-sectional view illustrating the construction of another can-covering polyester film according to the present invention.

As a polyester film to be bonded to a metal surface which is to be the inside of the can, there is used a can-covering polyester film 6 illustrated in FIG. 2. As shown in FIG. 2, the polyester film 6 is formed of the same biaxially oriented PET film 2 of 12 µm in thickness as that used in the polyester film 1a and provided on its one side with an adhesive layer 5a formed of the same thermosetting resin adhesive as that used in the polyester film 1a. The polyester film 6 has no printed layer and is plain. The polyester film 6 has been subjected in advance to a corona discharge treatment on the side to be coated with the adhesive layer 5a.

The polyester film 1a was produced in the following manner. The biaxially oriented PET film 2 in a continuous form, on one side of which a corona discharge treatment had been conducted in advance, was first taken out to coat the side subjected to no corona discharge treatment with a solvent type thermosetting resin composed of an epoxy resin and an aminoplast resin and added with a phosphoric acid catalyst by gravure rolls. The resin thus coated was dried at 160° C. for 8 seconds to form the cured overcoat layer 3 having a coat weight of 1.0 g/m². The thus-treated film 2 was cooled to 50° C. or lower and then taken up.

The continuous, biaxially oriented PET film 2 on which the cured overcoat layer 3 had been formed was then taken out to print on the opposite side of the overcoat layer 3 with printing inks comprising an epoxybutyral resin and a polyisocyanate resin and containing a pigment by gravure rolls. The printing inks were then dried to form the printed layer 4a. In the printed layer 4a, print patterns corresponding to a single can body are printed successively at predetermined intervals in a longitudinal direction of the biaxially oriented PET film 2 so as to successfully give a good aesthetic appearance and/or desired indication to the outer surface of a can.

The printed layer 4a was formed by using printing inks required for the formation of the print pattern to conduct printing one color by one color in the same manner as described above to give a coat weight of 1.0 g/m². After the formation of the printed layer 4a, the continuous biaxially oriented PET film 2 was cooled, taken up and then aged for 2 days to cure the printed layer 4a.

The continuous, biaxially oriented PET film 2, on which the printed layer 4a had been formed, was then taken out to apply a resin solution with the epoxy resin and glycerol tristrimellitate anhydride dissolved at the above weight ratio in an organic solvent to the printed layer 4a at a rate of 57 m/min by gravure rolls. The resin solution was dried at 120° C. for 10 seconds so as not to cause the curing reaction to progress, thereby forming the adhesive layer 5a composed of the thermosetting resin adhesive and having a coat weight of 2.5 g/m². The PET film 2 thus treated was cooled and then taken up to obtain the polyester film 1a.

In the polyester film 1a, the cured overcoat layer 3 is first formed and the printed layer 4a is then formed. Therefore, the print patterns can be obtained with excellent dimensional accuracy. The adhesive layer 5a is formed last of all. However, there is no fear of interfering with the use of the polyester film 1a in the subsequent step owing to the good tack-free properties of the adhesive layer 5a.

The polyester film 6 was produced in the following manner. The same biaxially oriented PET film 2 in a continuous form as that used in the production of the polyester film 1a was first taken out to subject one side thereof to a corona discharge treatment. The same resin solution of the adhesive as that used in the production of the polyester film 1a was then coated on the treated surface in the same manner as in the polyester film 1a. The resin solution was then dried in the same manner as in the polyester film 1a to form the adhesive layer 5a composed of the thermosetting resin adhesive and having a coat weight of 2.5 g/m². The PET film 2 thus treated was cooled and then taken up to obtain the polyester film 6.

Figure 3A:
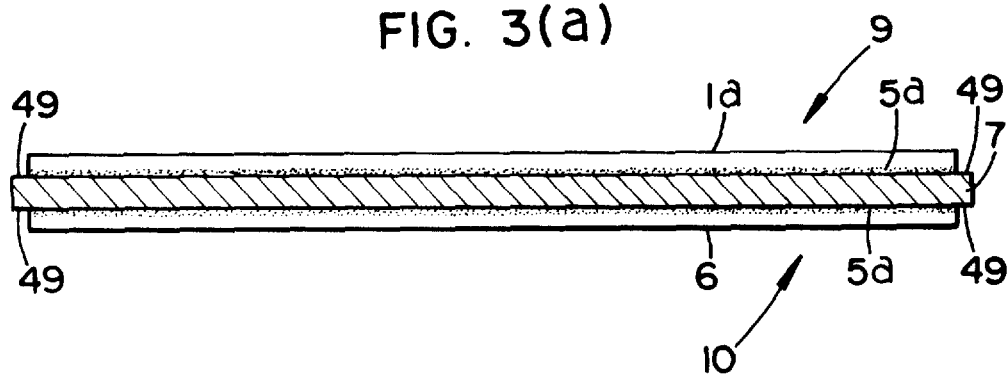
FIGS. 3(a) and 3(b) are cross-sectional views of a metal sheet for forming can bodies of welded cans, to which the can-covering polyester films according to the present invention have been separately bonded under heat, and a can body of a welded can, respectively.

The can-covering polyester films 1a and 6 were then used to produce welded cans. In a welded can in this example, as illustrated in FIG. 3(a), the polyester film 1a is bonded under heat to a surface of a metal sheet 7 for forming can bodies, which is to be the outside of the can, through the adhesive layer 5a to form a protective coat 9. On the other hand, the polyester film 6 is bonded under heat to a surface of the metal sheet 7, which is to be the inside of the can, through the adhesive layer 5a to form a protective coat 10. In this example, using, as the metal sheet 7, a tinned steel sheet 0.22 mm thick, which has a nickel under coat formed at a nickel deposition rate of 70 mg/m² on the surface of a base steel sheet, a tin layer plated on the under coat at a tin deposition rate of 0.8 g/m² and dispersed in a range of 10–60% of the surface area of the base steel sheet in an islandlike state and, as the outermost layer, a metallic chromium.chromium oxide layer formed at a deposition rate of 15 mg/m² in terms of chromium content, the bonding under heat was conducted by means of an apparatus as illustrated in FIGS. 4 and 5.

Figure 4:
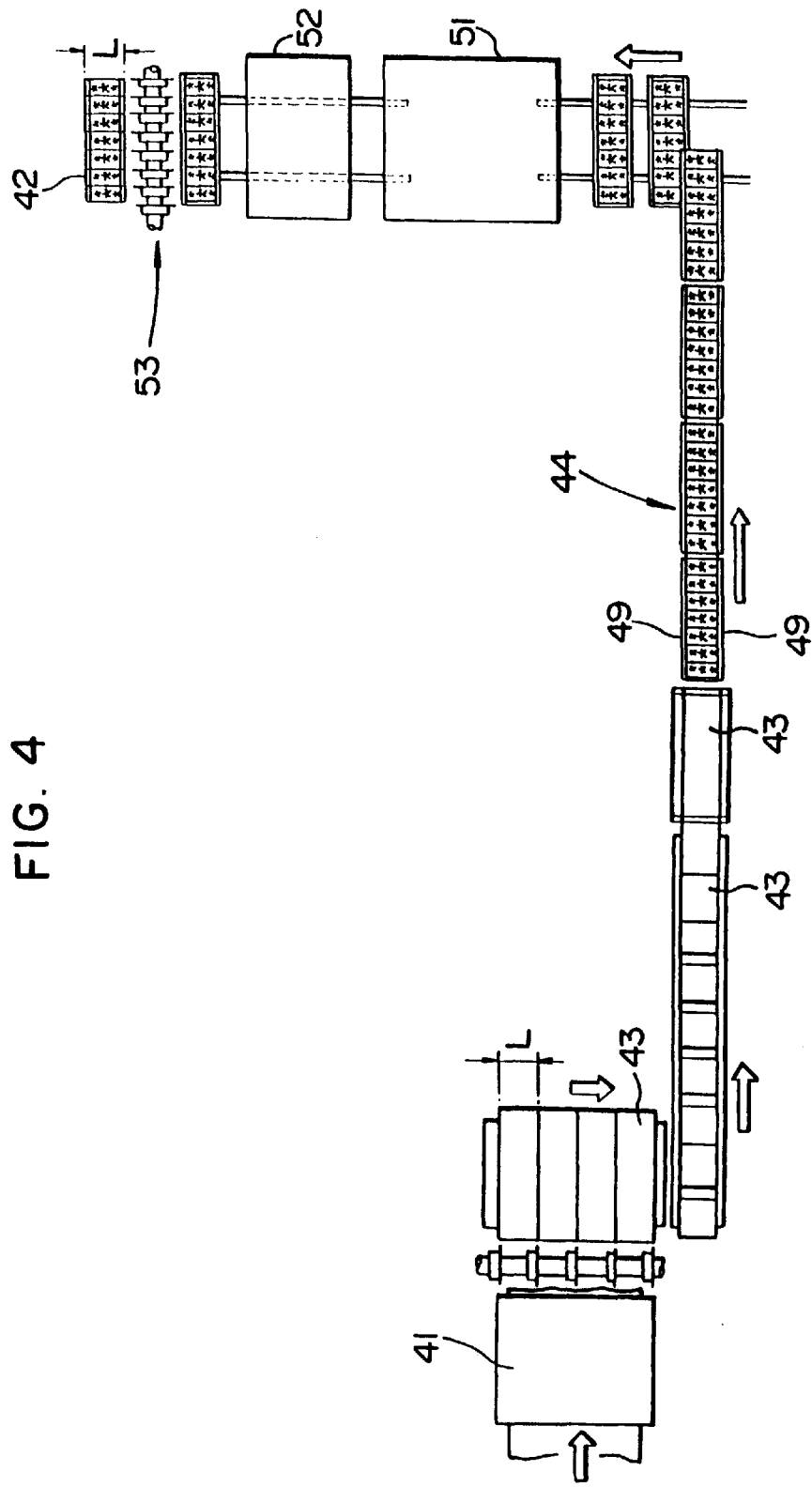
FIG. 4 is a schematic plan view illustrating an exemplary construction of an apparatus suitable for use in bonding under heat the can-covering polyester films according to the present invention to the metal sheet for forming can bodies of welded cans.

In the apparatus, as illustrated in FIG. 4, strip-like metal sheets 43 obtained by cutting an original sheet 41 for the metal sheet 7 into widths L each corresponding to the length of a blank 42 for can bodies are first successively fed to a conveying path 44. The strip-like metal sheet 43 has a length which is many times the width of a single can body blank 42.

Figure 5:
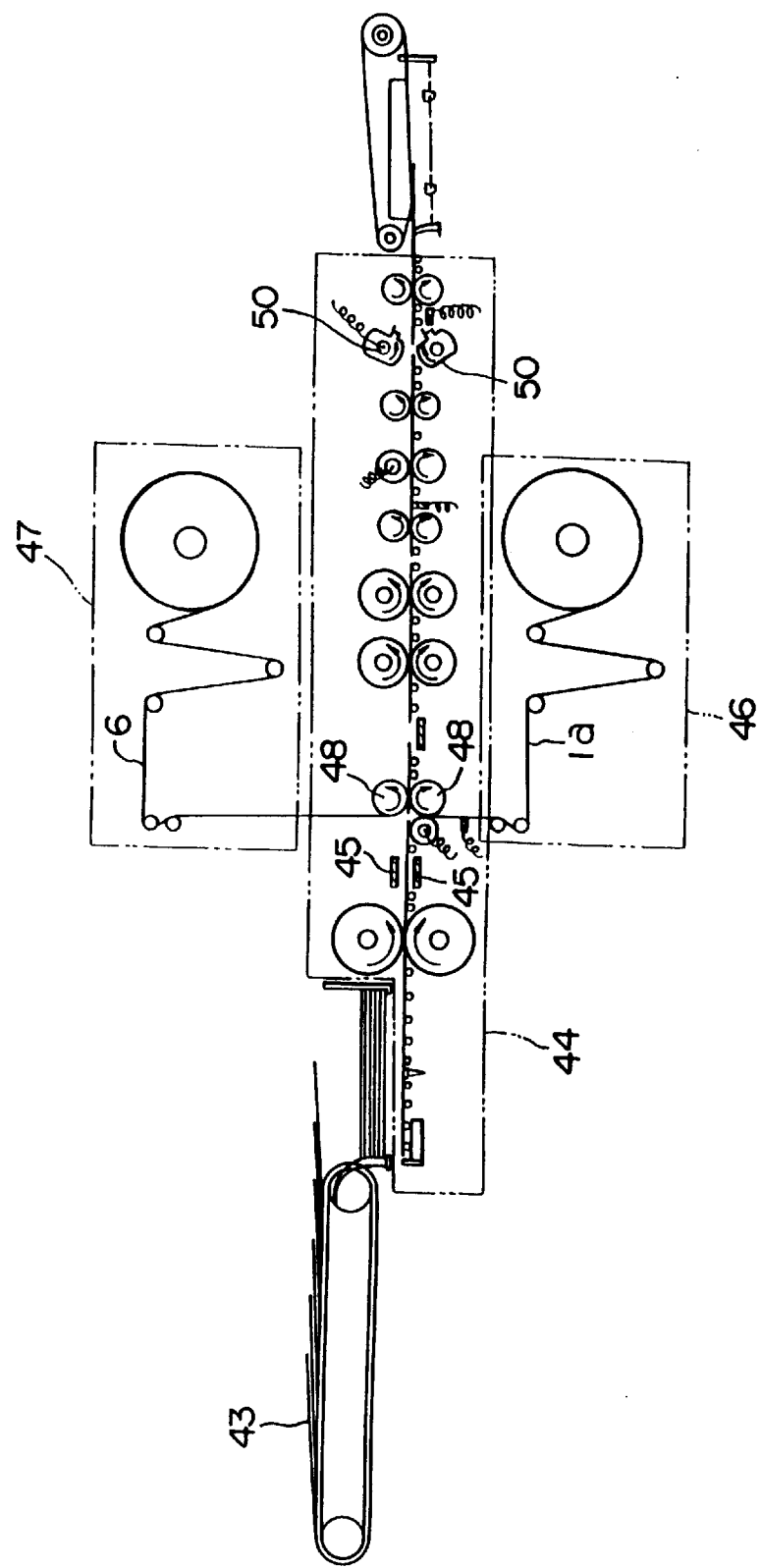
FIG. 5 is a side elevational view of a conveying path in the apparatus of FIG. 4.

As illustrated in FIG. 5 in section, the conveying path 44 is provided with the first heating means 45 such as a high-frequency heater on its upstream side so as to heat the strip-like metal sheet 43 fed to the conveying path 44 to 170° C. A printed film-feeding means 46 for feeding the continuous polyester film 1a printed in the above-described manner to the conveying path 44 is provided below the conveying path 44, while a plain film-feeding means 47 for feeding the plain continuous film 6 for covering the inside of a can is arranged above the conveying path 44. The polyester films 1a and 6 produced in the above-described manner are rolled up after their production and stocked as rolls respectively in the feeding means 46 and 47.

The polyester films 1a and 6 are respectively fed by the feeding means 46 and 47 to the conveying path 44 in such a manner that they come into contact with the strip-like metal sheet 43 on the side of the adhesive layer 5a, so that they are press-bonded to the respective surfaces of the strip-like metal sheet 43 heated in the above described manner except both side edges 49 of both surfaces thereof by pressure rolls 48 provided in the course of the conveying path 44, whereby the films are temporarily bonded to the metal sheet 43 through the respective adhesive layers 5a. At this time, the polyester film 1a does not stick itself owing to the good blocking resistance of the adhesive even when it is stocked as a roll in the feeding means 46 as described above. Further, since the cured overcoat layer 3 has been formed, the film 1a is good in slidability and resistance to damage, and can hence be appropriately taken out from the feeding means 46 to feed to the conveying path 44.

Since both polyester films 1a and 6 are continuous, the strip-like metal sheet 43 is held between the polyester films 1a and 6 temporarily bonded thereto, whereby a plurality of the metal sheets 43 are coupled in a continuous form. The continuous sheet of the strip-like metal sheets 43 coupled with each other is then cut into individual strip-like metal sheets 43 by the first cutting means 50 such as knife cylinders, which are provided at the terminal of the conveying path 44.

The strip-like metal sheets 43 to which the polyester films 1a and 6 have been temporarily bonded are then successively driven out of the conveying path 44 to be fed to the second heating means 51 such as a heating oven as illustrated in FIG. 4. In the heating oven 51, the strip-like metal sheet 43 to which the polyester films 1a and 6 have been temporarily bonded is held at 215° C. for 1 minute to cure the thermosetting resin adhesive of the adhesive layers 5a. As a result, the polyester films 1a and 6 are securely bonded to the strip-like metal sheet 43, thereby obtaining strong adhesion.

After the strip-like metal sheet 43, to which the polyester films 1a and 6 have been securely bonded as described above, is then cooled in a cooling means 52, it is fed to the second cutting means 53 such as a slitter and cut out into individual blanks 42 to form a single can body. Since the cured overcoat layer 3 has been formed on the polyester film 1a as described above, the original dimensional accuracy for the print can be kept even upon the heating for the temporary bonding and the heating in the heating oven 51. Therefore, the strip-like metal sheet 43 can be cut out into the can body blanks 42 in precise correspondence with the print patterns of the printed layer 4a.

Figure 3B:
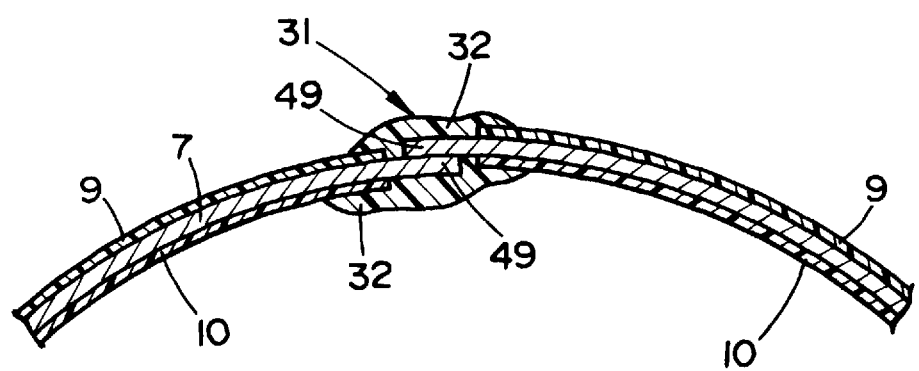

Each of the can body blanks 42 obtained in the above-described manner was then rounded with the surface, to which the polyester film 1a had been bonded, outside as illustrated in FIG. 3(b) so as to overlap both end edges 49 to each other, thereby welding the end edges to each other. A welded joint 31 on the inside of a can, which was not covered with the polyester film 6, was coated with an epoxy-phenolic resin compensation coating 32 to conduct coat compensation, thereby forming a can body. The can body was then subjected to drawing (neck-in forming and flange forming) at both open ends thereof. An easily openable can end coated with an epoxy-phenolic resin on the inside thereof was attached to one open end of the can body thus formed by double seaming to obtain a welded can.

At a stage before the welding, the metal sheet 7 had on the surface at both end edges 49 thereof a tin layer having a tin deposition rate of at least 0.10 g/m² and dispersed in a range of 10–60% of the surface area of the both end edges 49 in an islandlike or mottled state, so that good weldability was able to be provided.

With respect to the welded can, the adhesion properties of the polyester films 1a and 6 to the metal sheet 7 were observed, and the enamel rate value of the thus-obtained welded can was measured to determine the presence of a metal-exposed portion. The results are shown in Table 1.

Coffee as contents was then filled in the welded can, and a can end covered with a polyester film on the inside thereof was attached to the other open end of the welded can by double seaming, followed by a heat sterilization treatment (a retort sterilization treatment), thereby obtaining a sealed can. After the retort sterilization treatment, the appearance of the polyester film 1a was observed. Further, the sealed can was stored at 37° C. for 6 months and then opened to measure the amount of iron dissolved out in the contents. The results are shown in Table 1.

EXAMPLE 2

In this example, a blank 42 for a can body was formed in the same manner as in Example 1 except that a polyester film 1a' similar to the polyester film 1a illustrated in FIG. 1(a), in which the weight ratio of the epoxy resin to glycerol tristrimellitate anhydride in the thermosetting resin adhesive forming the adhesive layer 5a in the polyester film 1a was changed to 90/10, was used in place of the polyester film 1a, and the polyester films 1a' and 6 were bonded under heat to a metal sheet 7.

A welded can was then produced from the can body blank 42 in the same manner as in Example 1 to observe the adhesion properties of the polyester films 1a' and 6 to the tinned steel sheet, and to measure the enamel rate value of the thus-obtained welded can, thereby determining the presence of a metal-exposed portion. The results are shown in Table 1.

Coffee as contents was then filled in the welded can, and a can end covered with a polyester film on the inside thereof was attached to an open end of the welded can by double seaming, followed by a retort sterilization treatment, thereby obtaining a sealed can. After the retort sterilization treatment, the appearance of the polyester film 1a' was observed. In this example, the compounding ratio of the trimellitic acid anhydride hardener (glycerol tristrimellitate anhydride) in the thermosetting resin adhesive forming the adhesive layer 5a was higher than that in Example 1. Therefore, the whitening of the printed layer 4a due to the retort sterilization treatment was prevented, and so the print was kept in a vivid state. Further, the sealed can was stored at 37° C. for 6 months and then opened to measure the amount of iron dissolved out in the contents. The results are shown in Table 1.

Besides, in this example, an easily openable can end coated with an epoxy-phenolic resin on the inside thereof may be attached to an open end of the can body by double seaming as with Example 1. However, when an easily openable can end covered with a polyester film on the inside thereof is used, the whole inner surface of the can can be covered with the polyester resin, so that the resistance to change in flavor of the contents can be more improved.

EXAMPLE 3

In this example, a blank 42 for a can body was formed in the same manner as in Example 1 except that a polyester film 1a" similar to the polyester film 1a illustrated in FIG. 1(a), in which 60 wt. % of titanium oxide as a white pigment was contained in the thermosetting resin adhesive forming the adhesive layer 5a in the polyester film 1a, was used in place of the polyester film 1a, and the polyester films 1a" and 6 were bonded under heat to a metal sheet 7.

A welded can was then produced from the can body blank 42 in the same manner as in Example 1 to observe the adhesion properties of the polyester films 1a" and 6 to the tinned steel sheet, and to measure the enamel rate value of the thus-obtained welded can, thereby determining the presence of a metal-exposed portion. The results are shown in Table 1.

Coffee as contents was then filled in the welded can, and a can end covered with a polyester film on the inside thereof was attached to an open end of the welded can by double seaming, followed by a retort sterilization treatment, thereby obtaining a sealed can. After the retort sterilization treatment, the appearance of the polyester film 1a" was observed. In this example, the white pigment was contained in the adhesive layer 5a. Therefore, the bare surface of the metal sheet 7 was hidden, and so the print of the printed layer 4a became more vivid. Further, the sealed can was stored at 37° C. for 6 months and then opened to measure the amount of iron dissolved out in the contents. The results are shown in Table 1.

EXAMPLE 4

In this example, a welded can was produced in the same manner as in Example 1 except that the coat compensation for the welded joint 31 on the inside of a can body formed from the same can body blank 42 as that used in Example 1, said joint 31 being not covered with the polyester film 6, as illustrated in FIG. 3(b), was conducted with a thermoplastic polyester resin powder coating in place of the epoxyphenolic resin compensation coating 32 used in Example 1, and after the coating, a heat treatment was carried out at 250° C. for 6 seconds to form a compensation coating film having an average thickness of 30 µm. The adhesion properties of the polyester films 1a and 6 to the tinned steel sheet were observed, and the enamel rate value of the thus-obtained welded can was measured to determine the presence of a metal-exposed portion. The results are shown in Table 1.

Coffee as contents was then filled in the welded can, and a can end covered with a polyester film on the inside thereof was attached to an open end of the welded can by double seaming, followed by a retort sterilization treatment, thereby obtaining a sealed can. After the retort sterilization treatment, the appearance of the polyester film 1a was observed. Further, the sealed can was stored at 37° C. for 6 months and then opened to measure the amount of iron dissolved out in the contents. The results are shown in Table 1.

According to the can obtained in this example, the thermoplastic polyester resin powder coating is used as a coat compensation coating for the welded joint of the can body. Therefore, the whole inner surface of the can can be covered with the polyester resin, so that the resistance to change in flavor of the contents can be more improved.

EXAMPLE 5

Figure 1B:
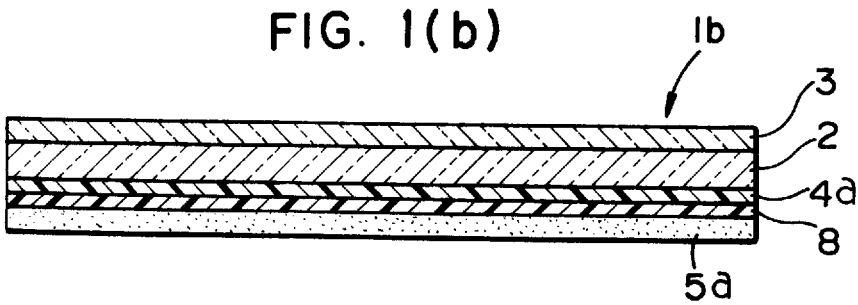

In this example, a blank 42 for a can body was formed in the same manner as in Example 1 except that a polyester film 1b illustrated in FIG. 1(b) was used in place of the polyester film 1a illustrated in FIG. 1(a), and the polyester films 1b and 6 were bonded under heat to a metal sheet 7.

As shown in FIG. 1(b), the polyester film 1b comprises the same PET film 2 as used in Example 1 and is provided on one side thereof with a cured overcoat layer 3 formed in the same manner as in Example 1, and on the other side thereof with a printed layer 4a formed in the same manner as in Example 1 and a size coat layer 8 formed on the printed layer 4a and composed of the same resin composition as the printing ink for the printed layer 4a except for omission of the pigment. On the size coat layer 8, an adhesive layer 5a is provided in the same manner as in Example 1.

The polyester film 1b was produced in the following manner. The cured overcoat layer 3 was first formed in the same manner as in Example 1 on the same biaxially oriented PET film 2 in a continuous form as that used in the production of the polyester film 1a. The thus-treated film 2 was cooled and then taken up. The continuous, biaxially oriented PET film 2, on which the cured overcoat layer 3 had been formed, was then taken out to form the printed layer 4a in the same manner as in Example 1. Thereafter, a resin solution composed of the same epoxybutyral resin and polyisocyanate resin as those used in the printed layer 4a, but containing no pigment was immediately coated on the printed layer 4a by gravure rolls and then dried to form the size coat layer 8. The continuous, biaxially oriented PET film 2 on which the size coat layer 8 had been formed was then cooled and taken up to age it for 2 days. On the size coat layer 8, the adhesive layer 5a was formed in the same manner as in Example 1, and the PET film 2 thus treated was cooled and then taken up to obtain the polyester film 1b.

A welded can was then produced from the can body blank 42 in the same manner as in Example 1 to observe the adhesion properties of the polyester films 1b and 6 to the tinned steel sheet, and to measure the enamel rate value of the thus-obtained welded can, thereby determining the presence of a metal-exposed portion. The results are shown in Table 1.

Coffee as contents was then filled in the welded can, and a can end covered with a polyester film on the inside thereof was attached to an open end of the welded can by double seaming, followed by a retort sterilization treatment, thereby obtaining a sealed can. After the retort sterilization treatment, the appearance of the polyester film 1b was observed. According to this example, the size coat layer 8 is provided on the printed layer 4a. Therefore, the printed layer 4a is not whitened even when conducting the retort sterilization treatment, and so the print is kept in a vivid state. Further, the sealed can was stored at 37° C. for 6 months and then opened to measure the amount of iron dissolved out in the contents. The results are shown in Table 1.

EXAMPLE 6

Figure 1C:
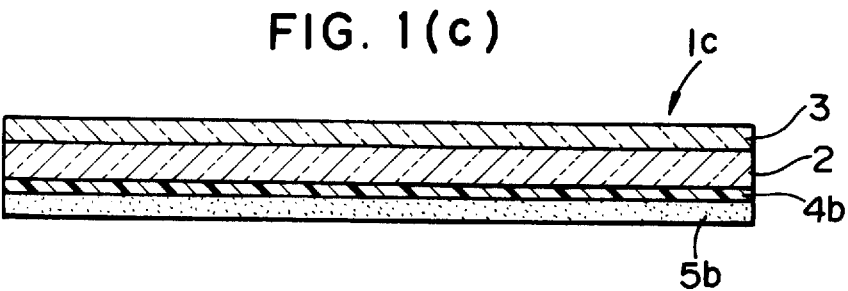

In this example, a blank 42 for a can body was formed in the same manner as in Example 1 except that a polyester film 1c illustrated in FIG. 1(c) was used in place of the polyester film 1a illustrated in FIG. 1(a), and the polyester films 1c and 6 were bonded under heat to a metal sheet 7.

As shown in FIG. 1(c), the polyester film 1c comprises the same PET film 2 as used in Example 1 and is provided on one side thereof with a cured overcoat layer 3 formed in the same manner as in Example 1, and on the other side thereof with a printed layer 4b printed with printing inks comprising a polyester polyurethane resin and a polyisocyanate resin and containing a pigment. The printed layer 4b is formed by laminating the printing inks separately containing pigments of desired colors on one another.

On the printed layer 4b, there is provided an adhesive layer 5b formed of a thermosetting resin adhesive comprising a polyester resin and a melamine resin at a weight ratio of 85/15. At least one pigment such as titanium oxide may be used to disperse it in the adhesive layer 5b if desired.

The polyester film 1c was produced in the following manner. The cured overcoat layer 3 was first formed in the same manner as in Example 1 on the same biaxially oriented PET film 2 in a continuous form as that used in the production of the polyester film 1a. The thus-treated film 2 was cooled and then taken up. The continuous, biaxially oriented PET film 2 on which the cured overcoat layer 3 had been formed was then taken out to print on the opposite side of the overcoat layer 3 with printing inks comprising a polyester polyurethane resin and a polyisocyanate resin and containing a pigment by gravure rolls. The printed layer 4b is formed by conduct printing with each of the printing inks of different colors in the above-described manner to give a coat weight of 1.0 g/m$^2$. After the formation of the printed layer 4b, the printed PET film 2 in a continuous form was cooled and then taken up to age it for 2 days.

The continuous, biaxially oriented PET film 2 on which the printed layer 4b had been formed was then taken out to apply the thermosetting resin adhesive comprising the polyester resin and the melamine resin at the above weight ratio to the printed layer 4b by gravure rolls. The resin adhesive was dried to form the adhesive layer 5b composed of the thermosetting resin adhesive and having a coat weight of 2.0 g/m$^2$. The PET film 2 thus treated was cooled and then taken up to obtain the polyester film 1c.

A welded can was then produced from the can body blank 42 in the same manner as in Example 1 to observe the adhesion properties of the polyester films 1c and 6 to the tinned steel sheet, and to measure the enamel rate value of the thus-obtained welded can, thereby determining the presence of a metal-exposed portion. The results are shown in Table 1.

Oolong as contents was then filled in the welded can, and a can end covered with a polyester film on the inside thereof was attached to an open end of the welded can by double seaming, followed by a retort sterilization treatment, thereby obtaining a sealed can. After the retort sterilization treatment, the appearance of the polyester film 1c was observed. Further, the sealed can was stored at 37° C. for 6 months and then opened to measure the amount of iron dissolved out in the contents. The results are shown in Table 1.

EXAMPLE 7

Coffee as contents was filled in the welded can obtained in Example 6, and a can end covered with a polyester film on the inside thereof was attached to an open end of the welded can by double seaming, followed by a retort sterilization treatment, thereby obtaining a sealed can. After the retort sterilization treatment, the appearance of the polyester film 1c was observed. Further, the sealed can was stored at 37° C. for 6 months and then opened to measure the amount of iron dissolved out in the contents. The results are shown in Table 1.

EXAMPLE 8

Figure 1D:
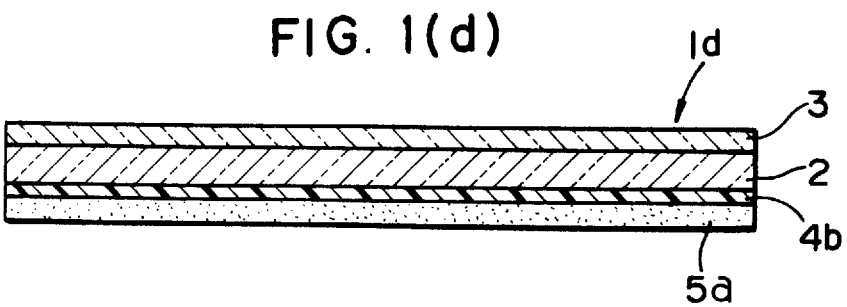

In this example, a blank 42 for a can body was formed in the same manner as in Example 1 except that a polyester film 1d illustrated in FIG. 1(d) was used in place of the polyester film 1a illustrated in FIG. 1(a), a tinned steel sheet 0.22 mm thick, which has a tin layer formed on the surface of a base steel sheet at a tin deposition rate of 1.2 g/m$^2$ and a metallic chromium.chromium oxide layer formed on the tin layer at a deposition rate of 18 mg/m$^2$ in terms of chromium content, was used in place of the metal sheet 7 used in Example 1, and the polyester films 1d and 6 were bonded under heat to the tinned steel sheet.

As shown in FIG. 1(d), the polyester film 1d comprises the same PET film 2 as used in Example 1 and is provided on one side thereof with a cured overcoat layer 3 formed in the same manner as in Example 1, and on the other side thereof with a printed layer 4b formed in the same manner as in Example 6 and an adhesive layer 5a formed on the printed layer 4b in the same manner as in Example 1.

The polyester film 1d was produced in the following manner. The cured overcoat layer 3 was first formed in the same manner as in Example 1 on the same biaxially oriented PET film 2 in a continuous form as that used in the production of the polyester film 1a. The thus-treated film 2 was cooled and then taken up. The continuous, biaxially oriented PET film 2 on which the cured overcoat layer 3 had been formed was then taken out to form the printed layer 4b in the same manner as in Example 6. The printed PET film 2 was cooled and then taken up to age it for 2 days.

The continuous, biaxially oriented PET film 2 on which the printed layer 4b had been formed was then taken out to apply the same resin solution of the thermosetting resin adhesive as that used in Example 1 to the printed layer 4b by gravure rolls, thereby forming the adhesive layer 5a in the same manner as in Example 1. The PET film 2 thus treated was cooled and then taken up to obtain the polyester film 1d.

A welded can was then produced from the can body blank 42 in the same manner as in Example 1. According to this example, at a stage before the welding, the tinned steel sheet has on the surface at both end edges 49 thereof a tin-iron alloy layer formed at a deposition rate of 0.7 g/m$^2$ in terms of tin content and a tin layer formed on the alloy layer at a tin deposition rate of 0.5 g/m$^2$. The tin-iron alloy layer is formed at an initial stage of the heating treatment in the heating oven 51 illustrated in FIG. 4, in which the polyester films 1d and 6 are bonded. The alloy serves to prevent tin from alloying further. Therefore, according to the tinned steel sheet, the tin layer of the above-described tin deposition rate was secured on the surface at both end edges 49 at the stage before welding, so that good weldability was able to be provided.

The adhesion properties of the polyester films 1d and 6 to the tinned steel sheet were observed, and the enamel rate value of the thus-obtained welded can was measured to determine the presence of a metal-exposed portion. The results are shown in Table 1.

Tea with lemon as contents was then filled in the welded can, and a can end covered with a polyester film on the inside thereof was attached to an open end of the welded can by double seaming, followed by a retort sterilization treatment, thereby obtaining a sealed can. After the retort sterilization treatment, the appearance of the polyester film 1d was observed. Further, the sealed can was stored at 37° C. for 6 months and then opened to measure the amount of iron dissolved out in the contents. The results are shown in Table 1.

EXAMPLE 9

In this example, a blank 42 for a can body was formed in the same manner as in Example 1 except that a polyester film 1d' similar to the polyester film 1d shown in FIG. 1(d), in which 60 wt. % of titanium oxide as a white pigment was contained in the thermosetting resin adhesive forming the adhesive layer 5a in the polyester film 1d, was used instead of the polyester film 1a illustrated in FIG. 1(a), and the polyester films 1d' and 6 were bonded under heat to a metal sheet 7.

A welded can was then produced from the can body blank 42 in the same manner as in Example 1 to observe the adhesion properties of the polyester films 1d' and 6 to the tinned steel sheet, and to measure the enamel rate value of the thus-obtained welded can, thereby determining the presence of a metal-exposed portion. The results are shown in Table 1.

Coffee as contents was then filled in the welded can, and a can end covered with a polyester film on the inside thereof was attached to an open end of the welded can by double seaming, followed by a retort sterilization treatment, thereby obtaining a sealed can. After the retort sterilization treatment, the appearance of the polyester film 1d' was observed. In this example, the white pigment was contained in the adhesive layer 5a. Therefore, the bare surface of the metal sheet 7 was hidden, and so the print of the printed layer 4b became more vivid. Further, the sealed can was stored at 37° C. for 6 months and then opened to measure the amount of iron dissolved out in the contents. The results are shown in Table 1.

EXAMPLE 10

In this example, a blank 42 for a can body was formed in the same manner as in Example 1 except that a polyester film 1c illustrated in FIG. 1(c) was used in place of the polyester film 1a illustrated in FIG. 1(a), a thinly tinned steel sheet 0.22 thick, which has a metallic chromium under coat formed at a chromium deposition rate of 100 mg/m$^2$ on the surface of a base steel sheet, a tin layer formed on the under coat at a tin deposition rate of 0.2 g/m$^2$ and, as the outermost layer, a metallic chromium.chromium oxide layer formed at a deposition rate of 12 mg/m$^2$ in terms of chromium content, was used in place of the metal sheet 7 used in Example 1, and the polyester films 1c and 6 were bonded under heat to the thinly tinned steel sheet.

A welded can was then produced from the can body blank 42 in the same manner as in Example 1. According to this example, the metallic chromium under coat prevents tin in the tin layer from alloying with iron even when subjected to the heating treatment in the heating oven 51 illustrated in FIG. 4, in which the polyester films 1c and 6 are bonded. As a result, the tin deposition rate of the tin layer in the thinly tinned steel sheet did not change before and after the heating treatment, and so good weldability was able to be provided.

The adhesion properties of the polyester films 1c and 6 to the thinly tinned steel sheet were observed, and the enamel rate value of the thus-obtained welded can was measured to determine the presence of a metal-exposed portion. The results are shown in Table 1.

A sporting drink as contents was then filled in the welded can by a hot pack method, and a can end covered with a polyester film on the inside thereof was attached to an open end of the welded can by double seaming, followed by a retort sterilization treatment, thereby obtaining a sealed can. After the retort sterilization treatment, the appearance of the polyester film 1c was observed. Further, the sealed can was stored at 37° C. for 6 months and then opened to measure the amount of iron dissolved out in the contents. The results are shown in Table 1.

EXAMPLE 11

In this example, a blank 42 for a can body was formed in the same manner as in Example 1 except that a polyester film 1c illustrated in FIG. 1(c) was used in place of the polyester film 1a illustrated in FIG. 1(a), a tin-free steel 0.22 thick, which has a metallic chromium under coat formed in the form of discs or granules at a chromium deposition rate of 60 mg/m$^2$ on the surface of a base steel sheet and a metallic chromium.chromium oxide layer formed on the under coat at a deposition rate of 10 mg/m$^2$ in terms of chromium content, was used in place of the metal sheet 7 used in Example 1, and the polyester films 1c and 6 were bonded under heat to the tin-free steel.

A welded can was then produced from the can body blank 42 in the same manner as in Example 1 to observe the adhesion properties of the polyester films 1c and 6 to the tin-free steel, and to measure the enamel rate value of the thus-obtained welded can, thereby determining the presence of a metal-exposed portion. The results are shown in Table 1.

When the tin-free steel is brought into contact under pressure with a welding electrode, the metallic chromium under coat plated in the granular form is embedded in the base steel sheet, so that the both end edges of the steel sheet are electrically connected directly to each other. Therefore, the tin-free steel can be welded irrespective of the tin deposition rate on the surface of the base steel sheet.

An apple juice drink (juice content: 10%) as contents was then filled in the welded can by a hot pack method, and a can end covered with a polyester film on the inside thereof was attached to an open end of the welded can by double seaming, followed by a retort sterilization treatment, thereby obtaining a sealed can. After the retort sterilization treatment, the appearance of the polyester film 1c was observed. Further, the sealed can was stored at 37° C. for 6 months and then opened to measure the amount of iron dissolved out in the contents. The results are shown in Table 1.

TABLE 1

| | Film on the outside of can | | | Adhesive in film on the | | Adesion properties | ERV | Appearance after retort | Amount of iron dis- |
|---|---|---|---|---|---|---|---|---|---|
| | Ink | Adhesive | Other feature | inside of can | Kind of film | of film | (mA) | treatment | solved (ppm) |
| Ex. 1 | Epoxybutyral/ polyisocyanate | Epoxy/hardener | | Epoxy/hardener | TNS | Excellent | ≦1 mA | Entirely normal | 0.1 |
| Ex. 2 | Epoxybutyral/ | Epoxy/hardener | Increased hardener | Epoxy/hardener | TNS | Excellent | ≦1 mA | Entirely normal | 0.1 |

TABLE 1-continued

|  | Film on the outside of can | | | Adhesive in film on the | | Adesion properties | ERV | Appearance after retort | Amount of iron dis- |
| --- | --- | --- | --- | --- | --- | --- | --- | --- | --- |
|  | Ink | Adhesive | Other feature | inside of can | Kind of film | of film | (mA) | treatment | solved (ppm) |
| Ex. 3 | Epoxybutyral/ polyisocyanate | Epoxy/hardener | White pigment in adhesive | Epoxy/hardener | TNS | Excellent | ≦1 mA | Entirely normal | 0.1 |
| Ex. 4 | Epoxybutyral/ polyisocyanate | Epoxy/hardener | Coat compensation with polyester | Epoxy/hardener | TNS | Excellent | ≦1 mA | Entirely normal | 0.1 |
| Ex. 5 | Epoxybutyral/ polyisocyanate | Epoxy/hardener | Provided with size coat | Epoxy/hardener | TNS | Excellent | ≦1 mA | Entirely normal | 0.1 |
| Ex. 6 | Polyester polyurethane/ polyisocyanate | Polyester/mel- amine | Filled with oolong | Epoxy/hardener | TNS | Excellent | ≦1 mA | Entirely normal | 0.1 |
| Ex. 7 | Polyester polyurethane/ polyisocyanate | Polyester/mel- amine | Filled with coffee | Epoxy/hardener | TNS | Excellent | ≦1 mA | Entirely normal | 0.1 |
| Ex. 8 | Polyester polyurethane/ polyisocyanate | Epoxy/hardener |  | Epoxy/hardener | LTS | Excellent | ≦1 mA | Entirely normal | 0.1 |
| Ex. 9 | Polyester polyurethane/ polyisocyanate | Epoxy/hardener | White pigment in adhesive | Epoxy/hardener | TNS | Excellent | ≦1 mA | Entirely normal | 0.1 |
| Ex. 10 | Polyester polyurethane/ polyisocyanate | Polyester/mel- amine |  | Epoxy/hardener | Cr/Sn system | Excellent | ≦1 mA | Entirely normal | 0.2 |
| Ex. 11 | Polyester polyurethane/ polyisocyanate | Polyester/mel- amine |  | Epoxy/hardener | Discoid · granular Cr system | Excellent | ≦1 mA | Entirely normal | 0.3 |

Incidentally, the kinds of the surface-treated steel sheets described in Table 1 are as follows:

TNS means a tinned steel sheet having a nickel under coat formed at a nickel deposition rate of 70 mg/m$^2$ on the surface of a base steel sheet, a tin layer plated on the under coat at a tin deposition rate of 0.8 g/m$^2$ and, as the outermost layer, a metallic chromium.chromium oxide layer formed at a deposition rate of 15 mg/m$^2$ in terms of chromium content. LTS denotes a tinned steel sheet having a tin layer formed on the surface of a base steel sheet at a tin deposition rate of 1.2 g/m$^2$ and a metallic chromium.chromium oxide layer formed on the tin layer at a deposition rate of 18 mg/m$^2$ in terms of chromium content. The Cr/Sn system stands for a thinly tinned steel sheet having a metallic chromium under coat formed at a chromium deposition rate of 100 mg/m$^2$ on the surface of a base steel sheet, a tin layer formed on the under coat at a tin deposition rate of 0.2 g/m$^2$ and, as the outermost layer, a metallic chromium.chromium oxide layer formed at a deposition rate of 12 mg/m$^2$ in terms of chromium content. The discoid.granular Cr system means a tin-free steel having a metallic chromium under coat composed of discoid chromium and granular chromium formed at a chromium deposition rate of 60 mg/m$^2$ on the surface of a base steel sheet and a metallic chromium.chromium oxide layer formed on the under coat at a deposition rate of 10 mg/m$^2$ in terms of chromium content.

The hardener in the column of the adhesive means glycerol tristrimellitate anhydride. ERV is an abbreviation of "enamel rate value".

It is apparent from Table 1 that the can-covering polyester films according to the present invention are strongly bonded to the metal sheets for forming can bodies by heating for a short period of time at a high temperature. It is also apparent from the measurements of the enamel rate value that the metal sheets to which the polyester films have been bonded have no metal-exposed areas.

According to the can-covering polyester films of the present invention, as shown in Table 1, no abnormalities such as whitening are recognized on the appearance of the films even when subjected to the retort sterilization treatment. It is hence apparent that the print is kept in a vivid state. The whitening preventing effect is particularly marked in the case where the size coat layer is provided (Example 5). When the adhesive layer 5a contains titanium oxide as the white pigment (Examples 3 and 9), the white adhesive layer 5a hides the bare surface of the metal sheet 7, so that the print becomes more vivid.

It is further apparent from Table 1 that according to the can-covering polyester films of the present invention, iron is scarcely dissolved out in the contents of the sealed can, the bond strength is kept good even when the cans are stored for a long period of time, and the corrosion of the metal sheets for forming can bodies and the change in the flavor of the contents can be prevented.

It is still further apparent from Examples 8 to 11 that the can-covering polyester films according to the present invention strongly adhere to a variety of the metal sheets for forming can bodies of welded cans.

In Examples 1 to 11 shown in Table 1, the polyester films 1a, 1a' and 1a" as illustrated in FIG. 1(a) are described in examples where they are bonded to the surface-treated steel sheet TNS, and not in examples where they are bonded to other steel sheets. However, the films can provide strong adhesion to the above-described LTS, Cr/Sn system and discoid.granular Cr system as with that to TNS.

Besides, the polyester film 1c as illustrated in FIG. 1(c) is described in examples where it is bonded to the surface-treated steel sheets TNS, Cr/Sn system and discoid.granular Cr system, and not in an example where it is bonded to another steel sheet. However, the film can provide strong adhesion to the above-described LTS as with that to TNS, Cr/Sn system and discoid.granular Cr system.

Similarly, the polyester films 1d and 1d' as illustrated in FIG. 1(d) are described in examples where they are bonded to the surface-treated steel sheets TNS and LTS, respectively, and not in examples where they are bonded to other steel sheets. However, the films can provide strong adhesion to the above-described Cr/Sn system and discoid.granular Cr system as with that to TNS and LTS.

Further, in the individual films, titanium oxide as a white pigment may be contained in each adhesive layer like the adhesive layer 5a in Example 3 or 9, and a size coat layer 8 may be provided like the polyester film 1b illustrated in FIG. 1(b).

In the following Examples 12 and 13, examples where the polyester film according to the present invention is applied to at least an outer side wall of a can obtained by forming a metallic closed-end cylindrical can having an opening at one end thereof by drawing with ironing from a metal sheet for forming cans composed of an aluminum alloy and attaching a can end separately produced to the opening by double seaming will be described.

EXAMPLE 12

Figure 6A:
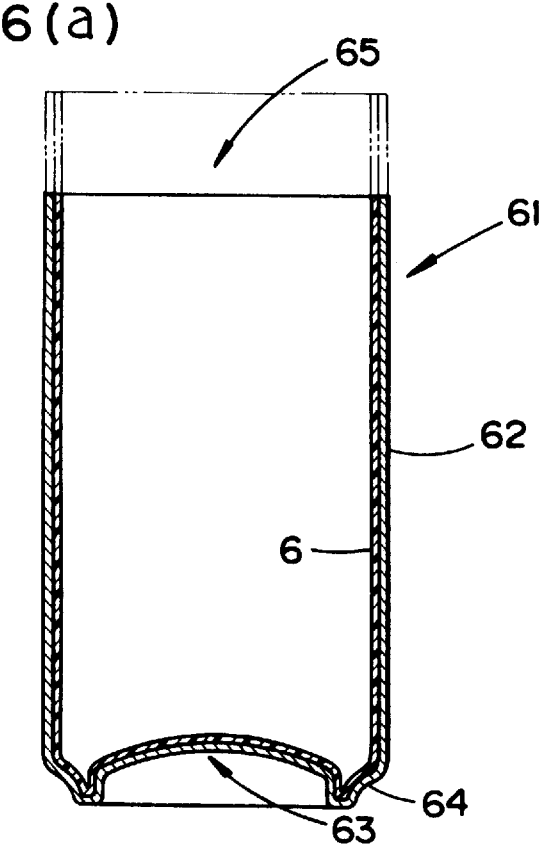
FIGS. 6(a) and 6(b) are cross-sectional views illustrating an exemplary closed-end cylindrical can, to which the can-covering polyester film or films according to the present invention have been bonded under heat.

In this example, the same polyester film 6 as that used in Example 1 was bonded under heat in advance to a side of a rolled metallic material (aluminum material 3004), which is to be the inside of a can, through the adhesive layer 5a. The rolled metallic material was then subjected to drawing with ironing (DI forming) to form a metallic closed-end cylindrical can 61 having an opening at one end thereof as illustrated in FIG. 6(a). The metallic can 61 to the inside of which the polyester film 6 has been bonded under heat has a side wall 62 flat in section and a bottom 63 curved inward. A foot 64 projecting outward is formed on the bottom 63. The metallic can 61 has an open end 65 in an opposed relation to the bottom 63. In the metallic can 61, a portion indicated by an imaginary line in FIG. 6(a) is trimmed to regulate the height of the can.

The can body 61 was then degreased and washed with water to remove oil attached to the inner and outer surfaces of the can body 61 upon the drawing with ironing and the like. Next, the outer surface of the can body 61 was subjected to a chemical conversion treatment with a phosphoric acid treating solution or the like, further washed with water and then dried.

Figure 6B:
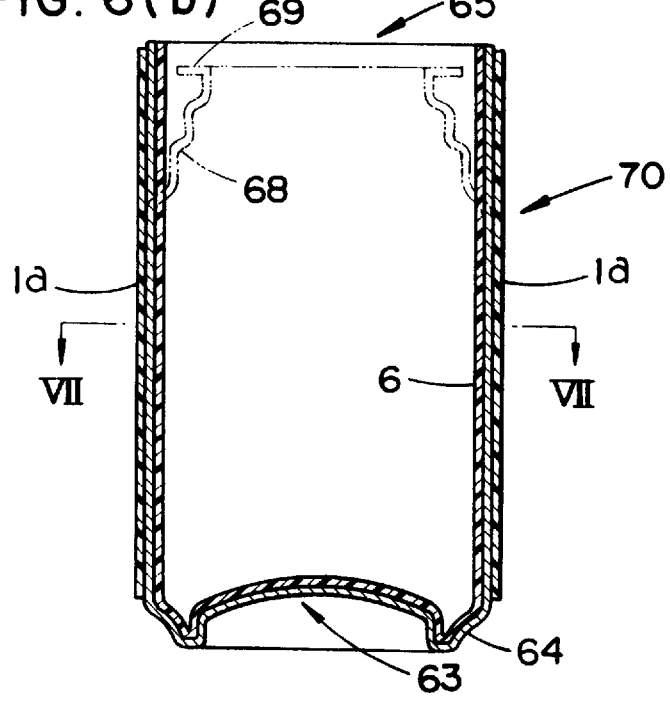

The metallic can 61 was then preheated in such a manner that the temperature of the outer surface of the can body was raised to 100°–200° C., whereby as shown in FIG. 6(b), the same polyester film 1a as that used in Example 1 was temporarily bonded to the outer surface of the metallic can 61 through the adhesive layer 5a by bringing them into contact under pressure with each other for a short period of time.

Figure 7A:
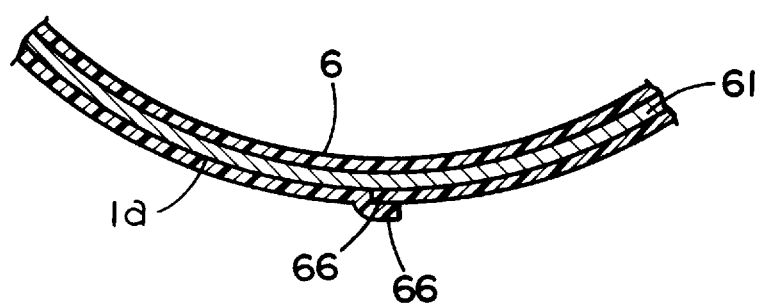
FIGS. 7(a) and 7(b) are fragmentary sectional views taken along line VII—VII of FIG. 6(b)
Figure 7B:
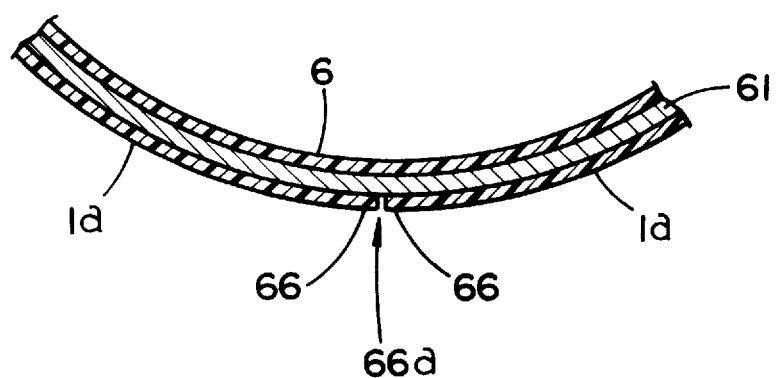

Both end edges 66 of a strip of the polyester film 1a may be either overlapped to each other to join them as illustrated in FIG. 7(a) or butted to join them as illustrated in FIG. 7(b). If they are butted to join them, it is desirable that a clearance 66a between the end edges 66 be narrowed as much as possible. It is generally adjusted to 0.5 or less.

The metallic can 61 thus treated was then held in a temperature range of 200°–210° C. for 1–2 minutes to heat it, thereby curing the adhesive layer 5a to increase the bond strength of the polyester film 1a . The metallic can 61 was then subjected to drawing (neck-in forming and flange forming) at the open end 65 thereof to form a neck-in part 68 and a flange 69 as indicated by an imaginary line in FIG. 6(b), thereby producing a can 70. In this can 70, the polyester films 1a and 6 were strongly bonded to the metallic can 61 through the respective adhesive layers 5a. Therefore, the peeling of the polyester films 1a and 6 was not recognized even at areas such as the foot 64, the neck-in part 68 and the flange 69, which were high in frequency of forming. In addition, it was possible to give an excellent aesthetic appearance to the outer surface of the can 70 by the printed layer 4a of the polyester film 1a.

In the can 70, the polyester film 6 has an internal stress generated by the drawing with ironing of the metallic material. However, the internal stress of the polyester film 6 bonded to the inner surface of the metallic can is conveniently lightened at the same time as the heat treatment after the temporary bonding of the polyester film 1a, in which the metallic can 61 is heated by holding it in a temperature range of 120°–230° C. for 30 seconds to 5 minutes to cure the adhesive layer 5a of the polyester film 1a, thereby increasing the bond strength of the polyester film 1a. The can 70 has excellent resistance to corrosion from its contents because its inner surface is covered with the polyester film 6.

EXAMPLE 13

Figure 8A:
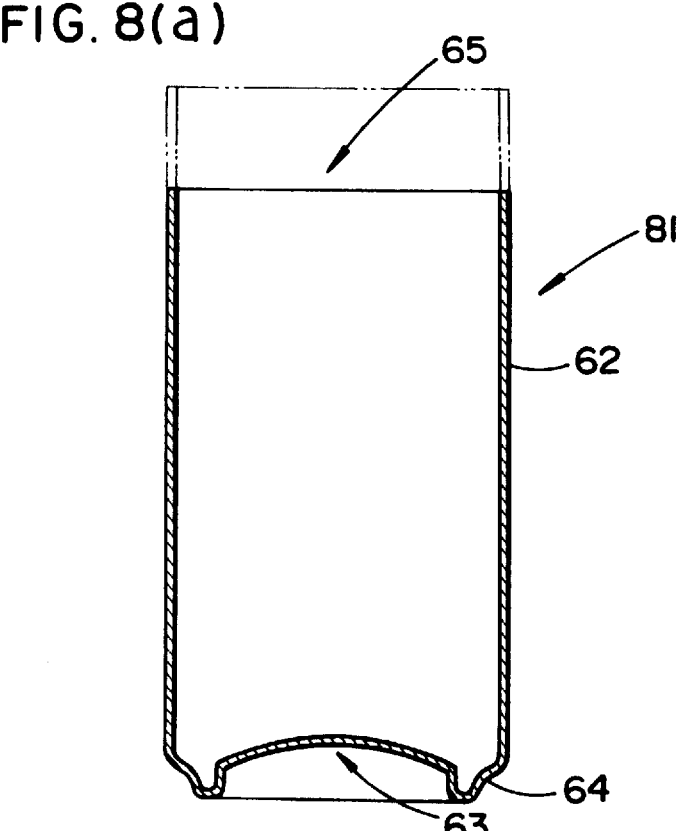
FIGS. 8(a) and 8(b) are cross-sectional views illustrating another exemplary closed-end cylindrical can, to which the can-covering polyester film according to the present invention has been bonded under heat.

In this example, a rolled metallic material (aluminum material 3004) was first subjected to drawing with ironing (DI forming) to form a metallic closed-end cylindrical can 81 having an opening at one end thereof as illustrated in FIG. 8(a). The metallic can 81 has the same constitution as that of the metallic can 61 illustrated in FIG. 6(a) except that a base metal is exposed on the inside thereof, and the polyester film 6 is not bonded thereto.

The can body 81 was then degreased and washed with water to remove oil attached to the inner and outer surfaces of the can body 81 upon the drawing with ironing and the like. Next, the can body 81 was subjected to a chemical conversion treatment with a phosphoric acid treating solution or the like, further washed with water and then dried.

Figure 8B:
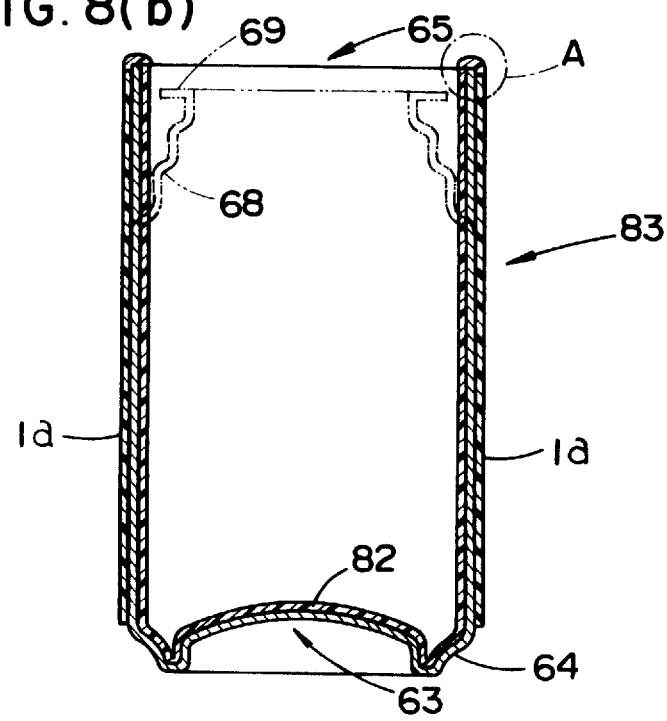
Figure 9:
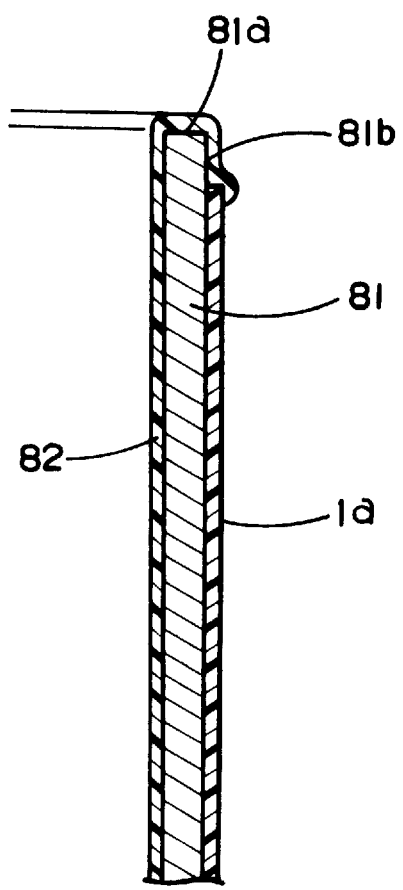
FIG. 9 is an enlarged sectional view of an area indicated by A in FIG. 8(b).

A water-based internal coating 82 was then applied to the metal-exposed area of the inner surface of the metallic can 81 as illustrated in FIG. 8(b). This coating process makes it possible for the internal coating 82 to coat the inner surface of the metallic can 81 and at the same time, to cover an end edge surface 81a of the base metal at the open end 65 of the metallic can 81 and an outer surface portion 81b not covered with the polyester film 1a when the film 1a is to be applied, as illustrated in FIG. 9. As the internal coating, there may be preferably used thermosetting coatings such as, for example, solvent type epoxy-phenolic resin coatings and water-based epoxy-acrylic resin coatings in that they can cure at a temperature near the curing temperature of the adhesive layer 5a.

The metallic can 81 was then preheated in such a manner that the temperature of the outer surface of the can body was raised to 100°–200° C., whereby as shown in FIG. 8(b), the same polyester film 1a as that used in Example 1 was temporarily bonded to the outer surface of the metallic can 81 through the adhesive layer 5a by bringing them into contact under pressure with each other for a short period of time.

The metallic can 81 thus treated was then held in a temperature range of 200°–210° C. for 1–2 minutes to heat it, thereby curing the adhesive layer 5a to increase the bond strength of the polyester film 1a and curing the internal coating 82. This heating is convenient because the heating for curing the adhesive layer 5a and the heating for curing the internal coating 82 can be conducted simultaneously.

The metallic can 81 was then subjected to drawing (neck-in forming and flange forming) at the open end 65 thereof to form a neck-in part 68 and a flange 69 as indicated by an imaginary line in FIG. 8(b), thereby producing a can 83. In this can 83, the polyester film 1a was strongly bonded to the metallic can 81 through the adhesive layer 5a. Therefore, the peeling of the polyester film 1a was not recognized even at the neck-in part 68 and the flange 69. In addition, it was possible to give an excellent aesthetic appearance to the outer surface of the can 83 by the printed layer 4a of the polyester film 1a.

The coating of a closed-end cylindrical can such as the metallic can 81 has heretofore been conducted in the following manner. After the internal coating 82 is first applied and baked in the same manner as described above, coatings of different colors are applied to the outer surface of the metallic can one by one and baked to give a good aesthetic appearance and desired indication to the outer surface of the can. Therefore, such a coating process reduces operating efficiency. However, in the metallic can 81 according to this example, it is only necessary to effect the coating and baking only on the internal coating 82 because the outer surface of the metallic can is covered with the polyester film 1a. Therefore, the operating efficiency can be improved compared with the conventional process. In addition, the operating efficiency can be more enhanced because the baking of the internal coating 82 can be effected at the same time as the heating for curing the adhesive layer 5a of the polyester film 1a.

In each of Examples 12 and 13, the metallic closed-end cylindrical can is formed by the drawing with ironing (DI forming) of the rolled metallic material. However, the metallic can may be formed by draw.thin.redraw (DTR) forming or draw-redraw (DR) forming. Although an aluminum alloy sheet is used as the metallic material, other materials for cans such as surface-treated steel sheets may be used.

In each of Examples 12 and 13, the polyester film 1a illustrated in FIG. 1(a) is used to cover the outer surface of the metallic can 61 or 81. However, the polyester film 1b or 1d illustrated in FIG. 1(b) or 1(d) may be used to provide strong adhesion to the metallic can 61 or 81 like the polyester film 1a. It is also possible give an excellent aesthetic appearance to the outer surface of the can by the printed layer 4a or 4b.

The invention being thus described, it will be obvious that the same may be varied in many ways. Such variations are not to be regarded as a departure from the spirit and scope of the invention, and all such modifications as would be obvious to one skilled in the are intended to be included within the scope of the following claims.

What is claimed is:

1. A can-covering polyester film which is heat-bondable to a metal surface of a can, comprising:

(A) polyester web capable of being rolled;
    (B) a non-tacky heat-bondable adhesive layer disposed on at least one side of said polyester web, comprising a heat-curable resin mixture comprising:
        (1) an bisphenol epoxy resin formed by the reaction of bisphenol A and epichlorohydrin, and having a number average molecular weight of 5,000 to 20,000, and
        (2) an acid anhydride hardener comprising trimellitic acid anhydride and derivatives thereof;
    wherein the weight ratio of said bisphenol epoxy resin to said acid anhydride hardener is 70/30 to 99/1.

2. The can-covering polyester film according to claim 1, further comprising (C) a cured overcoat layer, comprising a thermosetting resin formed on a side of the polyester web opposite the side of the polyester web with the heat bondable adhesive layer.

3. The can-covering polyester film according to claim 1, further comprising (D) a printed layer, comprising a resin composition and at least one pigment, disposed between the polyester web and the heat-bondable adhesive layer.

4. The can-covering polyester film according to claim 3, further comprising (E) a size coat layer comprising the resin composition of the printed layer, but without pigment, disposed between the printed layer and the heat bondable adhesive layer.

5. The can-covering polyester film according to claim 3, wherein said resin composition of said printed layer comprises a blend of an epoxybutyral resin and a polyisocyanate resin.

6. The can-covering polyester film according to claim 3, wherein said resin composition of said printed layer comprises a blend of a polyester polyurethane resin and a polyisocyanate resin.

7. The can-covering polyester film according to claim 1, wherein said heat-bondable adhesive layer further comprises a titanium oxide pigment.

8. A can-covering polyester film according to claim 1, wherein a print applied to said film maintains its brightness, the enamel rate value is less than or equal to 1 mA, and the amount of iron dissolved is 0.1 ppm.

9. A can covered by the can-covering polyester film according to claim 1, comprising:

(A) a metal cylinder, comprising one closed end and an opening in another end, and an outer side wall comprising a metal surface formed from a metal sheet;
    (B) the can-covering polyester film according to claim 1 disposed on said metal surface of said outer side wall, wherein said heat-bondable adhesive layer contacts said metal surface.

10. The can according to claim 9, wherein said outer side wall comprises a metal sheet curved so that side edges thereof overlap and are welded together.

11. The can according to claim 10, wherein said metal sheet further comprises a tin-iron alloy layer having a specific deposition of tin of 0 to 1.2 $g/m^2$ and a tin layer disposed on said tin-alloy layer having a specific deposition of tin of 0.5 to 1.6 $g/m^2$.

12. The can according to claim 10, wherein said metal sheet comprises a base steel sheet, a metallic nickel undercoat, and a tin layer plated on said undercoat having a specific deposition of tin of 0.5 to 1.7 $g/m^2$ and dispersed over 10% to 60% of the surface area of said base steel sheet in an island structure.

13. The can according to claim 10, wherein said metal sheet comprises a tinned steel sheet, a metallic chromium undercoat formed by plating chromium at a specific deposition of chromium of 10 to 200 $mg/m^2$, and a tin layer plated on said undercoat having a specific deposition of tin of 0.1 to 2.8 $g/m^2$.

14. The can according to claim 10, wherein said metal sheet comprises a tin-free steel, a metallic chromium undercoat formed by plating chromium in the form of discs or granules at a specific deposition of chromium of 10 to 200 $mg/m^2$.

* * * * *